United States Patent Office 3,478,902
Patented Nov. 18, 1969

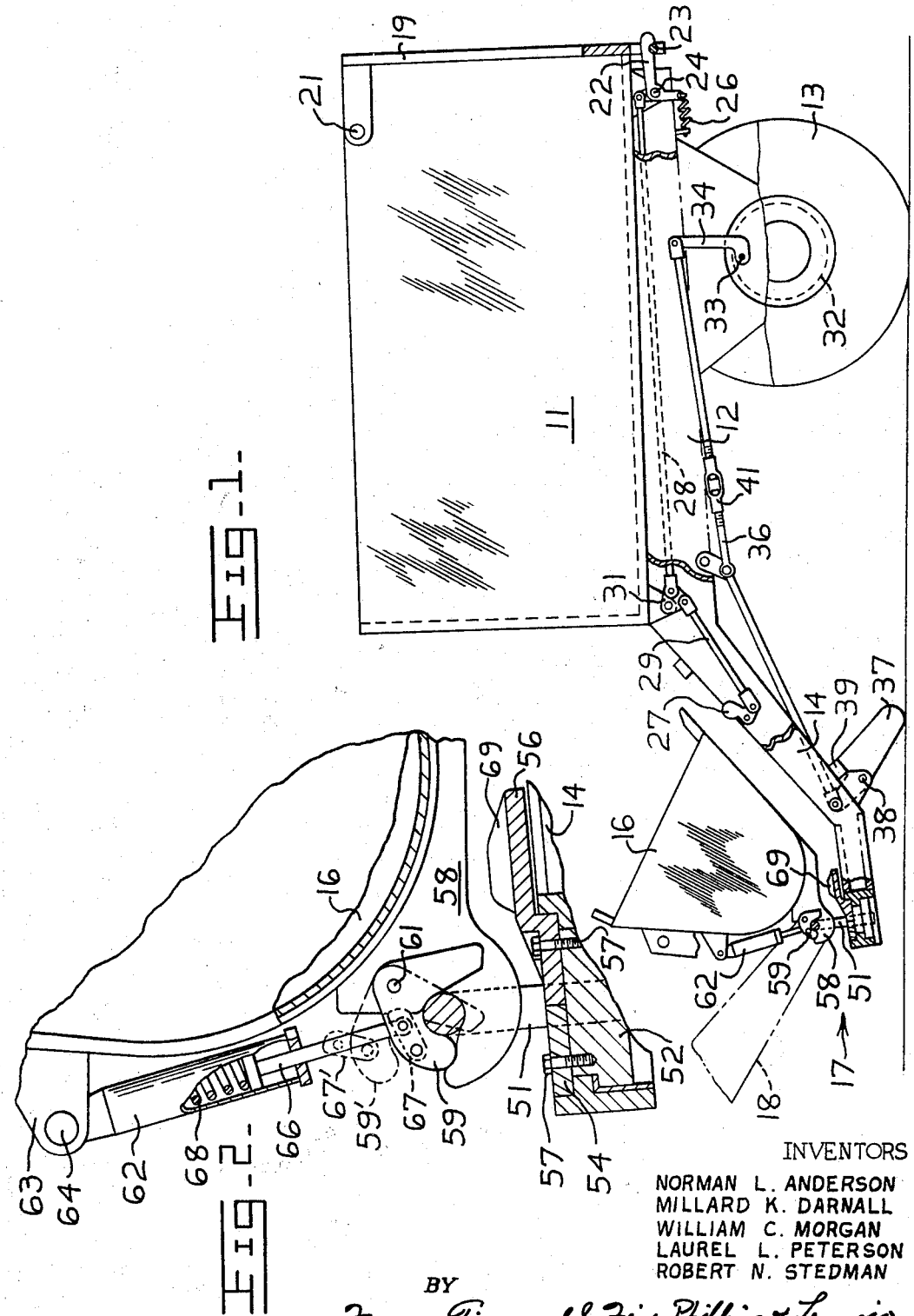

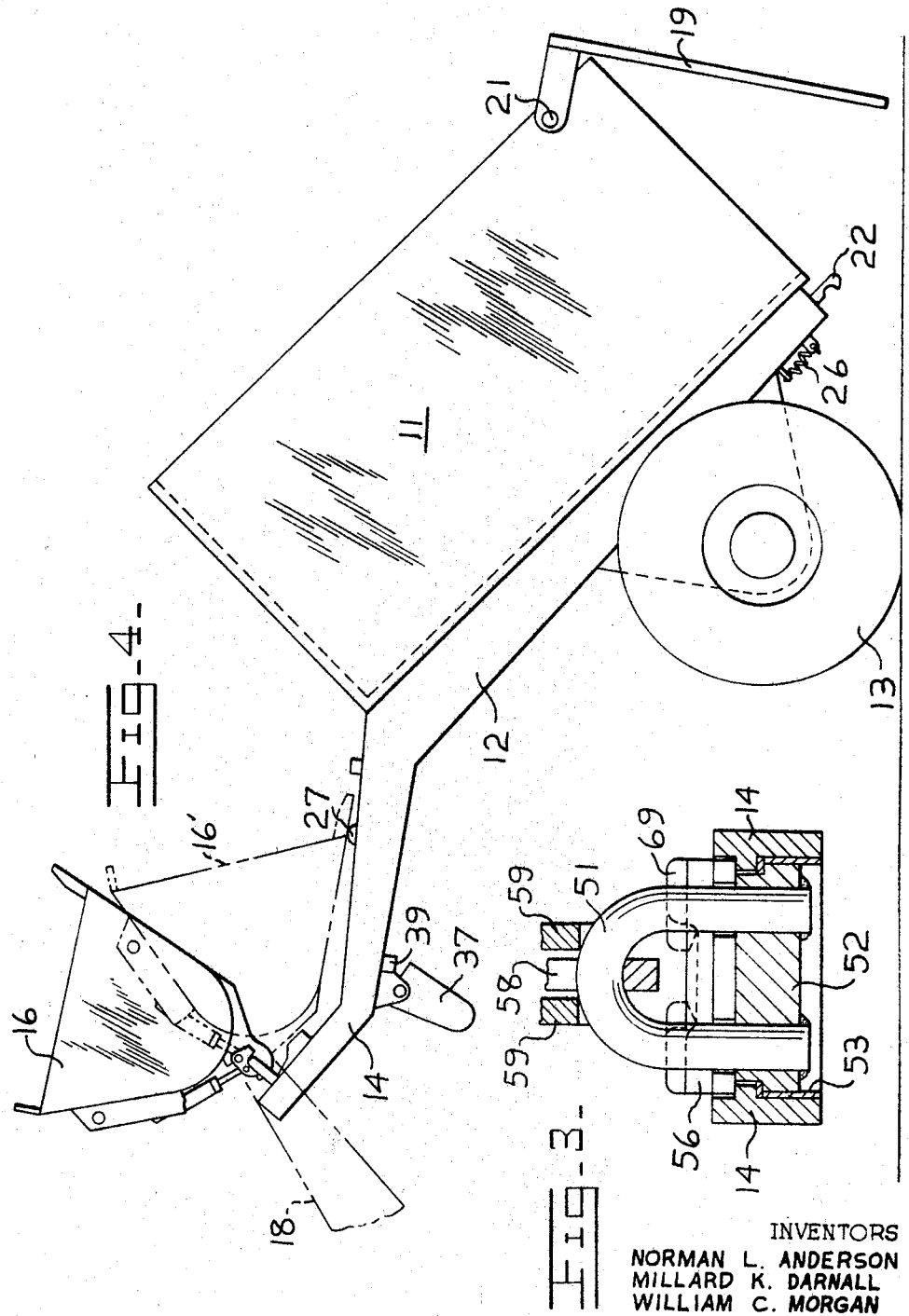

3,478,902
TRANSPORT VEHICLE FOR BUCKET LOADERS
Norman L. Anderson, Peoria, Millard K. Darnall, East Peoria, William C. Morgan, Chillicothe, Laurel L. Peterson, East Peoria, and Robert N. Stedman, Chillicothe, Ill., assignors to Caterpillar Tractor Co., Peoria, Ill., a corporation of California
Filed Mar. 11, 1968, Ser. No. 712,135
Int. Cl. E02f 3/40, 3/64
U.S. Cl. 214—38                                            7 Claims

ABSTRACT OF THE DISCLOSURE

A two-wheel transport vehicle to be loaded by a bucket loader and then engaged by the loader bucket assembly to permit the loader to transport the vehicle to an unloading site and dump it. The vehicle has a tailgate which is opened for unloading by forward tilting of the bucket and automatically engaged in a closed position after unloading. Brakes on the transport vehicle are automatically set by disengagement of the transport vehicle from the loader.

---

Although loaders have efficient loading cycles, their efficiency decreases rapidly in operations where they are also required to transport loaded material some distance for dumping. This inefficiency is due to the relatively limited capacity of the bucket which cannot be sufficiently increased without impairing its effectiveness during loading. On the other hand, the use of a separate vehicle or truck to receive material from the loader and transport it to an unloading site is uneconomical in many applications. The use of a self-powered truck, along with the need for an extra operator for the truck, unduly increases capital and operating costs. Quarry operations, where loaders are commonly employed to load and transport rocks to a crusher, are typical of applications where the above considerations and inefficiencies arise.

Accordingly, it is desirable to improve the transport rate in such operations with minimum capital and operating expenses.

The present invention accomplishes this purpose by providing an inexpensive transport vehicle which is to be loaded, transported and dumped by the loader vehicle employing only the normal loader operator and motor means.

The transport vehicle further permits the loader operator to perform the steps of loading, transporting and dumping as a substantially continuous cycle without leaving his station, thereby enhancing operating efficiency.

Other objects and advantages of the present invention are made apparent in the following description having reference to the accompanying drawings wherein:

FIG. 1 is a side view in elevation of the present transport vehicle and the bucket assembly of a wheel loader with parts in section;

FIG. 2 is an enlarged fragmentary view, with parts in section, of the connection between the transport vehicle drawbar and the wheel loader bucket;

FIG. 3 is another view of a drawbar hook portion of the connection taken from the left side of FIG. 2; and FIG. 4 is a view of the transport vehicle, with parts omitted for simplicity, upended by the wheel loader into a suitable position for dumping.

Referring now to FIG. 1, the transport vehicle has a body 11 mounted on a frame 12 which is supported by a pair of wheels, one of which is indicated at 13. A drawbar 14 extends forwardly from the frame. Means for connecting the drawbar to a bucket 16 of a loader (not shown) are indicated at 17. One of a pair of lift arms for supporting the bucket on the loader is indicated in broken lines at 18. As discussed below, the connection 17 is suitable to permit the loader operator to rapidly engage and disengage the bucket from the transport vehicle while remaining at his station to facilitate loading and transporting of the vehicle. In addition, connection of the drawbar to the forward ends of the bucket lift arms permits the operator to upend the transport vehicle for dumping (see FIG. 4) by the lift controls for the bucket 16. A tailgate 19 normally closes the rear end of the vehicle body 11 and is pivotally secured to each side of the vehicle body as at 21. To maintain the tailgate in its closed position during loading and transport, a latch assembly 22 engages a bar 23 on each side of the tailgate. To permit the tailgate to be disengaged and swing open during dumping (as shown in FIG. 4), the latch 22 is pivoted to the vehicle frame at 24 and is urged into latching engagement with the bars 23 by means of a spring 26. To release the tailgate, the latch is connected to a bellcrank 27 on the drawbar by means of links 28 and 29 through a stabilizing bellcrank member 31. Clockwise rotation of the bellcrank 27 acts through this connection to rotate the latch member 22 counterclockwise so that the bar 23 is released and the tailgate is permitted to open. The bellcrank 27 is disposed upon the drawbar for engagement by the bucket 16 as the bucket is tilted forwardly by conventional tilt controls (not shown) on the loader. Since the operator would normally tilt the bucket forwardly for dumping, the present invention permits him to use the same contro to initiate dumping of the transport vehicle.

To facilitate operation with the transport vehicle, particularly upon rough terrain, it is desirable to be able to lock the transport vehicle wheels against rotation while it is being loaded. Each wheel of the transport vehicle has a drum brake 32 which is normally disengaged and is engaged in a conventional manner by rotation of a shaft 33. To engage the brake, a lever 34 is secured to each rotatable shaft 33 and is connected by adjustable linkage 36 to a lever 37 which is pivotally secured at 38 to the drawbar 14. With the drawbar of the transport vehicle raised off the ground by the wheel loader, as for transportation, the lever 37 is free to rotate so that the brakes assume their normally disengaged position. However, when the loader is to be disengaged from the transport vehicle, the drawbar is lowered toward the ground so that the lever 37 is rotated counterclockwise as it comes into the contact with the ground. This counterclockwise motion is transmitted through the linkage 36 and lever 34 to rotate the shaft 33 and set the brakes to prevent rotation of the wheels. A stop 39 is disposed on the drawbar to be engaged by the lever 37 and prevent further rotation of the lever 37 after the brakes are firmly set. In this manner, the stop 39 limits the maximum force applied to the brakes to protect them from damage. As wear occurs in the brakes and in the levers and linkages controlling the brakes, the linkage 36 is adjustable by means of a turnbuckle 41 to insure continued proper engagement of the brakes.

The connection 17 between the transport vehicle drawbar and the bucket 16 is more clearly illustrated in FIGS. 2 and 3. A U-shaped rod or hook 51 is secured as by welding to a member 52 which fits within an opening 53 in the forward end of the drawbar. The member 52 and plates 54 and 56 are interlocked in place upon the drawbar by means of capscrews 57 so that the member 52 is rotatable within the opening 53. The hook 51 is normally disposed transversely to the drawbar to permit proper engagement with the latch described below. A latch assembly for clasping the hook comprises a fixed latch member 58 which is secured to the bottom of the bucket 16 and a rotatable latch member 59 which is pivotally connected to the fixed latch member 58 at 61. The rotatable latch member, in the position illustrated by the solid lines at 59, is closed so that it cooperates with the fixed latch member 58 to clasp the hook 51 and maintain the connection between the bucket and the drawbar. As the latch member 59 is rotated clockwise to a position illustrated by broken lines at 59', the cooperating latch members open rearwardly to engage or release the hook. The position of the rotatable latch member 59 is controlled by a one-way hydraulic jack 62 which is pivotally secured to a tab 63 on the bucket by means of a pin 64. The rod 66 of the jack is pivotally secured to the rotatable latch member 59 by means of a link 67. An alternate position of the link is illustrated at 67', corresponding to the rotated position 59' of the latch member. The hydraulic jack rod is urged into an extended position by a spring 68 so that it tends to close the latch. To open the latch for engagement or disengagement of the hook, the jack 62 is retracted against its spring 68 by conventional control means (not shown).

A typical operating cycle for the loader in conjunction with the present transport vehicle commences with the loader disengaged from the transport vehicle. The brakes 32 are engaged by the lever 37 as is generally shown in FIG. 1. The loader is conventionally operated to load the body of the transport vehicle. With the transport vehicle loaded, the loader operator positions the bucket latch assembly forwardly of, or to the right of the hook as seen in FIG. 1, and then lowers the bucket to generally align the latch members 58 and 59 for reception of the hook. The hydraulic jack 62 is retracted to open the latch and the loader maneuvered so that the latch members 58 and 59 approach toward the hook. As best seen in FIG. 3, the plate 56 has guide means or shoulders 69 so that the plate 56 is urged into proper alignment by the fixed latch member 58 to facilitate its passage through the eye of the hook. With the latch members generally in the position illustrated in FIGS. 1 and 2, the jack 62 is hydraulically released so that it is extended by its spring 68 and closes the latch members 58 and 59 about the hook. The loader bucket is then raised by the conventional loader lift jacks. Raising of the drawbar 14 permits the lever 37 to rotate freely so that the brakes on the transport vehicle are released. The transport vehicle is then moved to a suitable unloading site by the loader at which time the loader bucket is raised, for example, to its normal dump height so that the transport vehicle is upended to a suitable position for dumping as illustrated in FIG. 4. The bucket is tilted forwardly to a position illustrated in broken lines at 16' so that it contacts the cam member 27, thereby causing the latch member 22 to release the bars 23 and permitting the tailgate to swing away from the body for unloading as illustrated in FIG. 4. However, the tailgate is typically unlatched prior to tilting of the transport vehicle for unloading. After unloading of the transport vehicle it is returned to a level position by the loader bucket. Due to the manner in which the tailgate is pivotally connected to the body 11, it swings forward as the transport vehicle is leveled and is locked in its closed position by the latch 22. The transport vehicle is then returned to the loading site and disengaged from the loader bucket by means of the jack 62 to commence a new loading cycle.

It is to be noted that during the above operating cycle, construction and operation of the loader is varied only slightly in the addition of the latch and actuating jack 62. The design of the transport vehicle according to the present invention permits the loader operator to manipulate the transport vehicle in a very rapid and efficient manner without leaving his normal station. The normal procedure for unloading the transport vehicle is generally similar to that employed for dumping the bucket.

What is claimed is:
1. A transport vehicle for use in combination with a loader vehicle having a bucket mounted on the end of at least one lift arm which is pivotally secured to the vehicle and adapted to raise and lower the bucket during operation, comprising:
   a suitable body for receiving material loaded thereinto by the loader vehicle,
   means for connecting the transport vehicle to the loader vehicle for transport to an unloading site; and connecting means comprising a hook member on the transport vehicle and a latch mountable at the end of the lift arms, said latch being remotely operable for engagement and disengagement with the hook member.
2. The invention of claim 1 wherein the latch is mounted on the bucket and is operable by a single-acting, spring-loaded hydraulic jack.
3. The invention of claim 1 wherein the transport vehicle body is mounted on a pair of wheels and has a drawbar extending from one end thereof for mounting the connecting hook member, the other end of the body being open and having a pivotal tailgate normally closing the body during transport, the tailgate to be opened in response to operation of the loader to permit dumping of the transport vehicle.
4. The invention of claim 3 wherein the transport vehicle wheels are provided with normally released brakes and means operable to set the brakes in response to disengagement of the loader from the transport vehicle.
5. The invention of claim 4 wherein the brakes are engaged by a lever on the drawbar which at least partially supports the drawbar when the loader is disengaged from the transport vehicle.
6. The invention of claim 3 wherein spring-loaded latch means at the rear of the transport body tend to maintain the tailgate in its closed position, the tailgate latch means being operable to permit opening of the tailgate in response to operation of the loader.
7. The invention of claim 6 wherein the spring-loaded tailgate latch is rotatable and connected to a bellcrank member situated on the drawbar, the bellcrank member operable to rotate the latch and release the tailgate in response to forward tilting of the loader bucket thereagainst.

References Cited
UNITED STATES PATENTS 2,860,798  11/1958  Van Hellen _____ 214—318
2,910,203  10/1959  Todd _____ 214—672

HUGO O. SCHULZ, Primary Examiner

U.S. Cl. X.R.

214—145; 298—5